US009198132B2

(12) United States Patent
Tadaki (10) Patent No.: US 9,198,132 B2
(45) Date of Patent: Nov. 24, 2015

(54) MOBILE PHONE TERMINAL AND COMMUNICATION STATE TRANSITION METHOD THEREOF

(75) Inventor: Takashi Tadaki, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 216 days.

(21) Appl. No.: 13/989,951

(22) PCT Filed: Nov. 17, 2011

(86) PCT No.: PCT/JP2011/076477
§ 371 (c)(1),
(2), (4) Date: May 28, 2013

(87) PCT Pub. No.: WO2012/090615
PCT Pub. Date: Jul. 5, 2012

(65) Prior Publication Data
US 2013/0265925 A1    Oct. 10, 2013

(30) Foreign Application Priority Data
Dec. 27, 2010 (JP) ................................. 2010-290591

(51) Int. Cl.
*H04W 52/02* (2009.01)
(52) U.S. Cl.
CPC ...... *H04W 52/0258* (2013.01); *H04W 52/0225* (2013.01)
(58) Field of Classification Search
CPC .................................................. H04W 52/0258
See application file for complete search history.

(56) References Cited

U.S. PATENT DOCUMENTS

| 6,219,334 B1* | 4/2001 | Sato et al. ..................... 370/210 |
| 7,949,377 B2 | 5/2011 | Islam et al. |
| 8,654,694 B2 | 2/2014 | Chang et al. |
| 8,682,372 B2 | 3/2014 | Islam et al. |

(Continued)

FOREIGN PATENT DOCUMENTS

| CN | 101005659 | 7/2007 |
| CN | 101355604 | 1/2009 |

(Continued)

OTHER PUBLICATIONS

Ericsson, ST-Ericsson, "Clarifications on Fast Dormancy", 3GPP TSG-RAN WG2 Meeting #67bis R2-095713, Oct. 12, 2009, pp. 1-4 [online], [retrieved on Feb. 7, 2012]. Retrieved from the Internet <URL:hhtp:/www.3gpp.org/ftp/tsg_ran/WG2_RL2/TSGR2_67bis/Docs/R2-095713.zip>.

(Continued)

*Primary Examiner* — Charles C Jiang
*Assistant Examiner* — Thad Defauw
(74) *Attorney, Agent, or Firm* — Young & Thompson (57) ABSTRACT

A mobile phone terminal has a transition request function in which the mobile phone terminal transmits to a network a state transition request that the state of communication with the network be set to a pocket idle state if a packet communication idle state continues for a predetermined time in a state in which the mobile phone terminal is connected to the network in an RRC (Radio Resource Control) state. The mobile phone terminal includes a control section that controls the transition request function based on a communication history of the mobile phone terminal, based on a transmission power value of the mobile phone terminal, or based on a reception electric field value of the mobile phone terminal.

2 Claims, 5 Drawing Sheets

(56) References Cited

U.S. PATENT DOCUMENTS

| | | |
|---|---|---|
| 2007/0135080 A1 * | 6/2007 | Islam et al. ............... 455/343.1 |
| 2009/0028084 A1 | 1/2009 | Ping |
| 2011/0116427 A1 * | 5/2011 | Chang et al. ............... 370/311 |
| 2014/0206369 A1 | 7/2014 | Islam et al. |

FOREIGN PATENT DOCUMENTS

| | | |
|---|---|---|
| JP | 05-191457 | 7/1993 |
| JP | 2007-166627 | 6/2007 |
| JP | 2007-214711 | 8/2007 |
| WO | WO 2008/023649 | 2/2008 |
| WO | 2008-113784 | 9/2008 |

OTHER PUBLICATIONS

Cn Office Action, dated Aug. 17, 2015; Application No. 201180063014.2 X.

3GPP Tsg-RAN2 Meeting #72, Jacksonville, Fl {Usa), 15-19 Nov. 2010, Disc on the Ue fast dormancy controlled by the network.

* cited by examiner

Fig.3

| | Site information | Idle communication time | | | | Number of updates |
|---|---|---|---|---|---|---|
| | | Cell-DCH | Cell-FACH | Cell-PCH | Idle | |
| 1 | http://****.ne.jp/main/* | 10.5 sec | 35.7 sec | 5.4 sec | 0 sec | 2 |
| 2 | http://****.ne.jp/top/* | 8 sec | 0 sec | 0 sec | 0 sec | 1 |
| 3 | http://****.com/news* | 19.4 sec | 53.6 sec | 6.9 sec | 2.1 sec | 4 |
| 4 | http://******.com | 12.6 sec | 60.3 sec | 10.1 sec | 0 sec | 5 |
| 5 | http://****.co.jp/japan/* | 6.2 sec | 0 sec | 0 sec | 0 sec | 1 |
| 6 | http://****.co.jp/japan/* | 10.3 sec | 41 sec | 8.5 sec | 0 sec | 3 |
| 7 | http://******.co.jp/japan | 15.7 sec | 28.3 sec | 1.6 sec | 0 sec | 3 |

Fig.4

MOBILE PHONE TERMINAL AND COMMUNICATION STATE TRANSITION METHOD THEREOF

TECHNICAL FIELD

The present invention relates to a mobile phone terminal and a communication state transition method thereof, in particular, to a mobile phone terminal, which transmits to a network a state transition request that the state of communication with the network be set to a packet idle state if a packet communication idle state continues for a predetermined time in a state in which the mobile phone terminal is connected to the network in an RRC (Radio Resource Control) state, and to a communication state transition method thereof.

BACKGROUND ART

The W-CDMA (Wideband Code Division Multiple Access) based packet communication system needs to allocate radio resources. Thus, the W-CDMA based packet communication system has a plurality of communication states so as to effectively use radio resources in accordance with the amount of communication data or in accordance with the accommodation number (the number of users), the communication states including a Cell-DCH state, a Cell-FACH state, a Cell-PCH state, and a packet idle state.

The Cell-DCH state is a communication state in which a mobile phone terminal can communicate with the network at high speed. In the Cell-DCH state, communication channels are allocated to individual users. Moreover, in the Cell-DCH state, uplink and downlink communication channels are allocated on both the mobile phone terminal side and the network (hereinafter abbreviated as the NW) side. A mobile phone terminal needs to always communicate with the network so as to maintain uplink and downlink communication channels. Thus, the amount of current consumed by the mobile phone terminal in the Cell-DCH state is large compared to that in the other communication states.

In the Cell-FACH state, uplink and downlink communication channels are shared by other mobile phone terminals. The data communication speed in the Cell-FACH state is slow compared to that in the Cell-DCH state. However, the Cell-FACH state does not need to always maintain an uplink communication channel. Instead, in the Cell-FACH state, an uplink communication channel which is referred to as the RACH (Random Access Channel) can be allocated when necessary. Thus, the amount of current that is consumed by the mobile phone terminal in the Cell-FACH state is small compared to that in the Cell-DCH state. However, even in the Cell-FACH state, a downlink communication channel is always maintained (opened).

The Cell-PCH state is a communication state that takes place when there are no communication packet data. The Cell-PCH state is a standby state that is maintained until communication packet data occur. In the Cell-PCH state, a downlink communication channel is intermittently allocated. Thus, the amount of current that is consumed in the Cell-PCH state is very small compared to that in the Cell-FACH state.

In the Cell-PCH state, since a downlink communication channel is intermittently allocated, the Cell-PCH state is very similar to the packet idle state that will be described later. However, in the Cell-PCH state, an RRC connection is set up between the mobile phone terminal side and the NW side. Thus, the mobile phone terminal communicates with a particular base station in a semi-communication state. As a result, the Cell-PCH state has an advantage in which a call connection process is quickly performed when packet communication resumes in response to occurrence of communication packet data, specifically, a communication state transition from the Cell-PCH state to the Cell-DCH state is more quickly performed than that from the packet idle state to the Cell-DCH state.

The packet idle state is a communication state in which the foregoing RRC connection is lost. In the packet idle state, although radio resources between the mobile phone terminal and the NW are released, Packet Data Protocol Context (hereinafter referred to as the PDP Context), which is a packet communication protocol, is maintained. Thus, when the packet communication resumes, the PDP Context does not need to be set up again. Instead, only the RRC connection is performed. Consequently, the process time, which is the period from when the state of communication with network is set to the packet idle state until the packet communication resumes, is slightly short compared to the process time during which the packet communication starts up.

The NW side uses the foregoing individual communication states so as to effectively employ communication resources. Specifically, the NW side has a system that causes each mobile phone terminal to perform a communication state transition to a communication state in which it does not waste a lot of radio resources based on a predetermined parameter. The parameter includes the amount of packet data to be communicated and idle packet communication time.

Normally, when packet communication starts up, the mobile phone terminal performs the packet communication in the Cell-DCH state. Thereafter, as the amount of packet data to be communicated decreases, the NW causes the mobile phone terminal to perform communication state transitions to the Cell-FACH state, the Cell-PCH state, and the packet idle state.

In contrast, if the amount of packet data to be communicated increases, the NW causes the mobile phone terminal to perform a communication state transition to any one of these communication states depending on the amount of packet data to be communicated or the communication time of the packet communication. In this case, generally, the NW causes the mobile phone terminal to perform a communication state transition to the Cell-DCH state.

The data amount or communication time of the packet communication, which is a parameter based on which the NW causes the mobile phone terminal to perform a communication state transition, is a characteristic value of the NW side. However, this parameter may differ area by area.

As described above, generally, the NW controls communication state transitions for the mobile phone terminal. The mobile phone terminal cannot control communication state transitions. Thus, even if the mobile phone terminal is not performing packet communication with the NW, the mobile phone terminal needs to maintain a communication state in which more current is consumed than that in the other communication states. In other words, a problem in which the mobile phone terminal cannot perform communication state transitions to communication states in which its current consumption is low occurs.

Patent Literature 1 describes a communication system that allows a mobile phone terminal to perform communication state transitions to other states. In the communication system described in Patent Literature 1, the mobile phone terminal controls communication state transitions between the Cell-DCH state and the Cell-FACH state based on the communication history.

On the other hand, the Fast Dormancy function that allows a mobile phone terminal to control communication state transitions has been established by the 3rd Generation Partnership Program (hereinafter referred to as the 3GPP).

The Fast Dormancy function is a function that causes a mobile phone terminal to notify the NW of an event of a release of the RRC connection (only the RRC connection is released, but the PDP Context is maintained) if an idle packet communication state continues for a predetermined time.

This function allows a mobile phone terminal to perform communication state transitions from each communication state directly to the packet idle state. Thus, it is expected to accomplish a communication state transition control taking into consideration the reduced amount of current that is consumed by the mobile phone terminal.

RELATED ART LITERATURE

Patent Literature

Patent Literature 1: JP2007-214711A, Publication

SUMMARY OF THE INVENTION

Problem to be Solved by the Invention

In the current Fast Dormancy function, after an idle packet communication state continues for a predetermined time, the mobile phone terminal performs a communication state transition to the packet idle state. Thus, the current Fast Dormancy function does not operate by taking into consideration the communication environment and operation style of the mobile phone terminal that differs in each user. In addition, the current Fast Dormancy function causes the mobile phone terminal to perform a communication state transition directly to the packet idle state. Thus, when packet communication resumes, the mobile phone terminal needs to establish the RRC connection with the NW again. As a result, the time after the mobile phone terminal performs a communication state transition to the packet idle state until the packet communication resumes is longer than the time after the mobile phone terminal performs a communication state transition to another communication state until the packet communication resumes. Consequently, depending on the user's operation style, a demerit of deterioration of operability of the Fast Dormancy function becomes more noticeable than a merit of the current reduction thereof.

From this point of view, the current Fast Dormancy function that causes a mobile phone terminal to perform a communication state transition to the packet idle state if the idle packet communication state continues for a predetermined time is not flexible. Thus, the Fast Dormancy function needs to satisfy the operation environment and operation style of the user.

An object of the present invention is to provide a mobile phone terminal and a communication state setup method thereof that can solve the foregoing problem.

Means that Solve the Problem

A mobile phone terminal according to the present invention is a mobile phone terminal that has a transition request function in which the mobile phone terminal transmits to a network a state transition request that the state of communication with the network be set to a pocket idle state if a packet communication idle state continues for a predetermined time in a state in which the mobile phone terminal is connected to the network in an RRC (Radio Resource Control) state, and the mobile phone terminal includes control means that controls the transition request function based on the communication history of the mobile phone terminal, based on the transmission power value of the mobile phone terminal, or based on the reception electric field value of the mobile phone terminal.

A communication state transition method according to the present invention is a communication state transition method for a mobile phone terminal that has a transition request function in which the mobile phone terminal transmits to a network a state transition request that the state of communication with the network be set to a pocket idle state if a packet communication idle state continues for a predetermined time in a state in which the mobile phone terminal is connected to the network in an RRC (Radio Resource Control) state, and the communication state transition method includes controlling the transition request function based on the communication history of the mobile phone terminal, based on the transmission power value of the mobile phone terminal, or based on the reception electric field value of the mobile phone terminal.

Effect of the Invention

According to the present invention, the Fast Dormancy function can be controlled depending on the operation environment and operation style of the user.

MODES THAT CARRY OUT THE INVENTION

Next, with reference to the accompanying drawings, exemplary embodiments of the present invention will be described.

(First Exemplary Embodiment)

Figure 1:
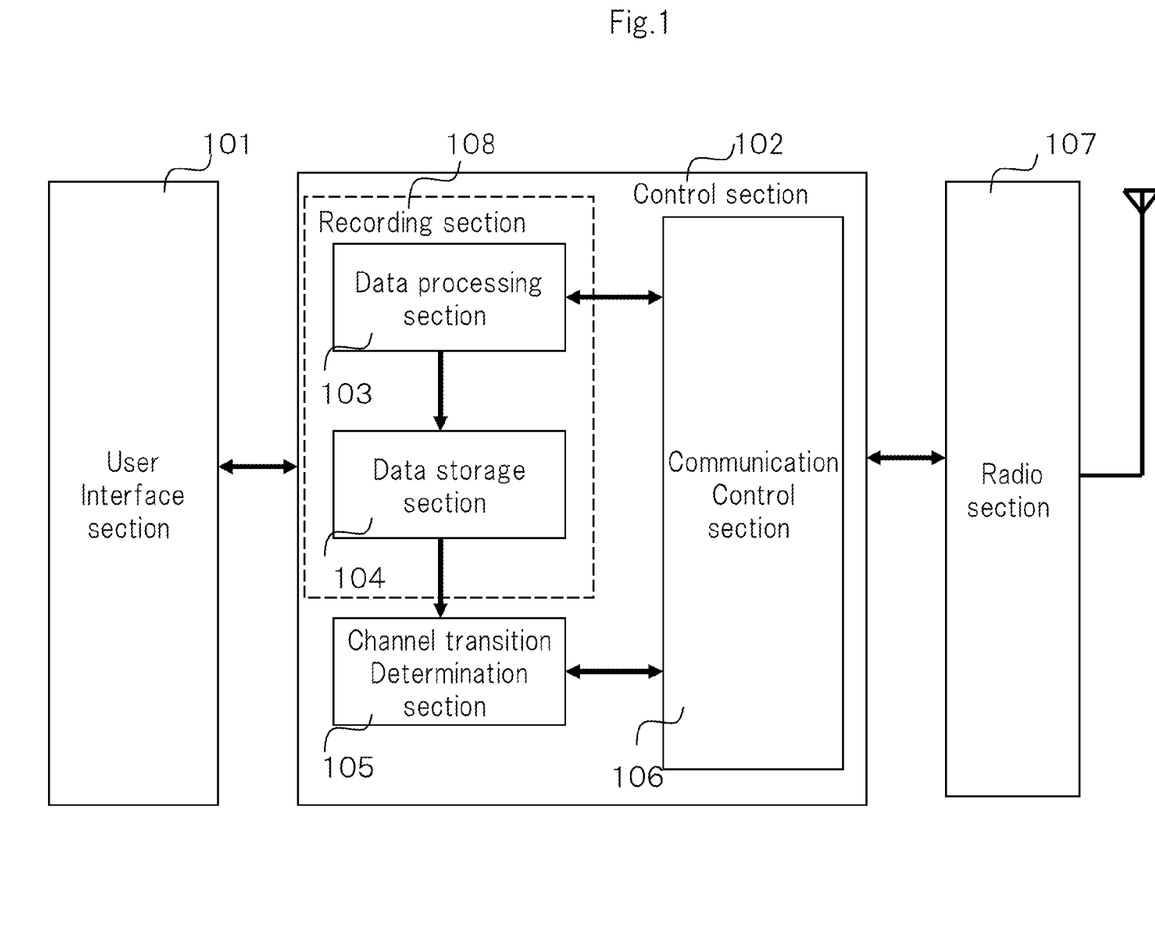
FIG. 1 is a block diagram showing a mobile phone terminal according to a first exemplary embodiment of the present invention.

FIG. 1 is a block diagram showing a mobile phone terminal according to the first exemplary embodiment of the present invention.

In FIG. 1, the mobile phone terminal is a W-CDMA based mobile phone terminal and includes user interface section 101, control section 102, and radio section 107.

The mobile phone terminal has a Fast Dormancy function. The Fast Dormancy function is a function that causes a mobile phone terminal that is connected to the NW in the RRC connection state to transmit to the NW a state transition request that the state of communication with the network be set to a packet idle state if an idle packet communication state continues for a predetermined time (hereinafter, referred to as the "timer value"). The Fast Dormancy function may be generally referred to as the transition request function.

The mobile phone terminal has communication states including a Cell-DCH state, a Cell-FACH state, a Cell-PCH state, and a packet idle state.

User interface section 101 has an operation function including a packet communication operation that the user performs and a page update operation that the user performs when he or she browses a site; and a display function that displays site browsing information and so forth.

Control section 102 can be generally referred to as the control means. Control section 102 controls the Fast Dormancy function based on the communication history of the mobile phone terminal, the transmission power value thereof, or the reception electric field value thereof.

Control section 102 includes data processing section 103, data storage section 104, channel transition determination section 105, and communication control section 106.

Data processing section 103 determines whether or not packet communication data are present and records idle communication time based on the determined result. According to this exemplary embodiment, data processing section 103 categorizes the idle communication time in individual communication states corresponding to communication state transition information notified by communication control section 106 and records the categorized information.

Data storage section 104 generates history information (communication history information) based on the information recorded by data processing section 103 and stores the generated history information.

Data processing section 103 and data storage section 104 are included in recording section 108. Recording section 108 can be generally referred to as the recording means. Recording section 108 stores the history information. The history information represents idle packet communication time of each web page that has been browsed on the mobile phone terminal. In addition, the history information represents idle packet communication time in each communication state.

Channel transition determination section 105 can be generally referred to as the setting means. Channel transition determination section 105 controls the Fast Dormancy function (for example, startup and timer value).

For example, channel transition determination section 105 sets up a timer value for a web page that is represented in the history information and that is browsed based on an idle communication time for the web page represented in the history information. In this case, for example, channel transition determination section 105 sets up a timer value such that it is inversely proportional to the idle communication time for the web page.

In addition, channel transition determination section 105 weights an idle communication time in each communication state indicated in the history information and sets up a timer value based on the weighted idle communication time in each communication state. For example, channel transition determination section 105 sets up a timer value such that it is inversely proportional to the weighted idle communication time of each communication state.

Moreover, channel transition determination section 105 sets up a timer value based on the transmission power value of the mobile phone terminal or the reception electric field value thereof. For example, channel transition determination section 105 sets up a timer value such that it is inversely proportional to the transmission power value of the mobile phone terminal or is proportional to the reception electric field value thereof.

Communication control section 106 controls the overall communication operations including packet communication.

Radio section 107 executes radio-communication with the NW.

The W-CDMA based mobile phone terminal according to this exemplary embodiment autonomously releases radio resources based on the user's radio environment, operation style, or operation history if no packet communication data occur in a browser that the user uses to browse a web page. Thus, the amount of current that is consumed can be effectively reduced.

The W-CDMA based mobile phone terminal according to this exemplary embodiment adjusts the Fast Dormancy function startup timer value based on history information of the past idle communication time for each web page that has been browsed and information of the transmission power value of the mobile phone terminal that performs the packet communication, and so forth. As a result, the Fast Dormancy function that better satisfies the user's operation environment and operation style than previously can be accomplished.

For example, since the user generally browses a news web page longer than other web pages, after the packet communication that receives the web page is complete, the idle packet communication time becomes long. If the mobile phone terminal receives such a web page, it sets up a small timer value so as to start up the Fast Dormancy function early. As a result, since the amount of current that is consumed can be reduced, a remarkable energy saving effect can be realized.

In an area or a fringe area where the NW controls communication state transitions such that the mobile phone terminal is maintained in the Cell-DCH state for a long period of time, the mobile phone terminal requires more transmission power when it starts communication. Thus, if the mobile phone terminal starts up the Fast Dormancy function early, the amount of current that is consumed can be reduced and thereby a remarkable energy saving effect can be realized.

When the Fast Dormancy function startup timer value is adjusted based on the user's operation style or operation environment, the amount of current that is consumed can be effectively reduced according to each user without reducing the operability of the mobile phone terminal.

Next, the operation according to this exemplary embodiment will be described in brief.

(1) When the user starts browsing a web page, the mobile phone terminal performs packet communication with the NW in the Cell-DCH state. Thereafter, the NW performs communication state transitions based on a parameter such as the amount of packet data to be communicated or an idle packet communication time.

(2) After the mobile phone terminal has received data for which the user browses a web page through packet communication with the NW, the mobile phone terminal (data processing section 103) determines that the idle packet communication state has occurred and starts totalizing the idle communication time. The mobile phone terminal records the idle communication time in each communication state. For example, if the mobile phone terminal performs a communication state transition from the Cell-DCH state to the Cell-FACH state while it records the idle communication time, the mobile phone terminal separately manages the recorded result in the Cell-DCH state and the recorded result in the Cell-FACH state.

(3) After starting the packet communication, if no packet communication resumes for a predetermined time, the mobile phone terminal (data processing section 103) records idle communication times in individual communication states starting from the Cell-DCH state as the mobile telephone terminal performs communication state transitions. If the user browses another web site or the mobile phone terminal initiates the Fast Dormancy function and thereby the mobile phone terminal performs a communication state transition, data processing section 103 stops totalizing idle communication times and outputs the totalized results to data storage section 104 located in the mobile phone terminal. When data storage section 104 stores the totalized results, if the mobile phone terminal has accessed the web site and data storage section 104 has stored an idle communication time for the web site, data storage section 104 calculates the average of the current totalized result and the past totalized result and stores the calculated result.

(4) While data processing section 103 and data storage section 104 are operating, if data storage section 104 has not stored history information about the web site that the user is browsing, the mobile phone terminal (channel transition determination section 105) calculates the correction amount for the Fast Dormancy function startup timer value based only on the current transmission power value. If data storage section 104 has stored history information about the web site that the user is browsing, the mobile phone terminal calculates the correction amount based on the past average idle communication time and the current transmission power value of the web site. The mobile phone terminal (channel transition determination section 105) corrects the timer value based on the correction amount.

(5) When the mobile phone terminal (channel transition determination section 105) determines that the idle packet communication state has occurred, the mobile phone terminal starts counting the corrected timer value. The transmission power value affects the amount of current that is consumed by the mobile phone terminal. In addition, while the mobile phone terminal is communicating with the NW, the transmission power value always varies. Thus, while channel transition determination section 105 is counting the timer value, it may correct the timer value corresponding to the transmission power value.

(6) Thereafter, while the idle packet communication state takes place, if the timer value expires, the mobile phone terminal (channel transition determination section 105) notifies the NW that the RRC connection has been released and performs a communication state transition to the packet idle state. Before the timer value expires, if the user causes the packet communication to resume and the mobile phone terminal operates in other than the idle packet communication state, channel transition determination section 105 stops counting the timer value.

(7) Thereafter, until the user stops browsing the web page, the foregoing steps (2) to (6) are repeated.

Next, the operation according to this exemplary embodiment will be described.

In the following, the operation according to this exemplary embodiment is divided into (A) recording method for idle communication time of each web page that is browsed and (B) correction method for the Fast Dormancy function startup timer value.

Figure 2:
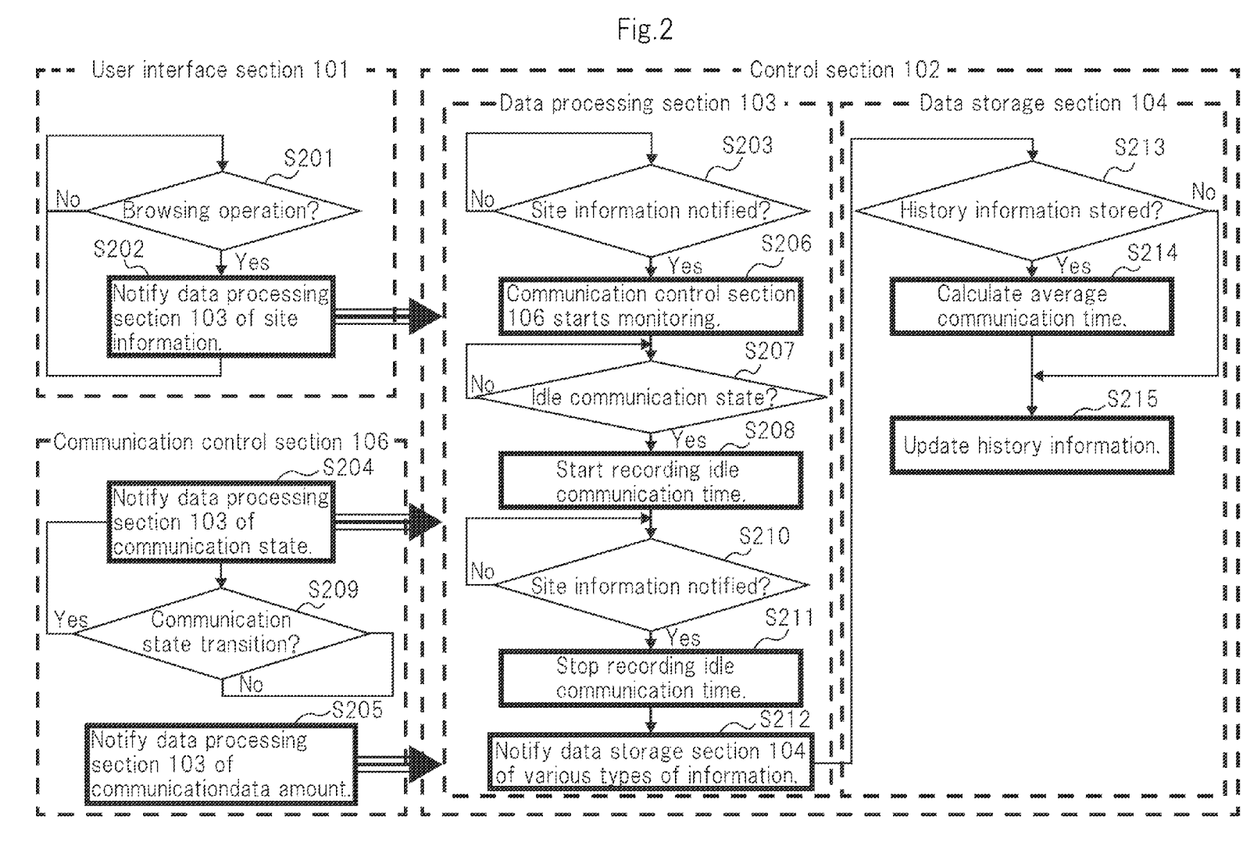
FIG. 2 is a flow chart describing a recording method of idle communication time for each web page.

(A) Recording method for idle communication time of each web page that is browsed FIG. 2 is a flow chart describing the recording method for the idle communication time of each web page that is browsed.

When the user operates the mobile phone terminal to browse a web site (at step S201), user interface section 101 notifies data processing section 103 of site information (for example, URL) (at step S202).

When data processing section 103 receives the site information from user interface section 101 (at step S203), data processing section 103 recognizes the web site that is browsed based on the site information and obtains the current communication state and the amount of packet data to be communicated from communication control section 106 (at steps S204 and S205). Thereafter, data processing section 103 monitors them (at step S206).

If data processing section 103 determines that the idle packet communication state has occurred based on the monitored amount of packet data to be communicated (at step S207), data processing section 103 starts recording the idle communication time (at step S208). If the NW performs a communication state transition while data processing section 103 is recording the idle communication time (at steps S209 and S204), data processing section 103 records the idle communication time in the former communication state and the idle communication time in the current communication state.

This exemplary embodiment exemplifies that data processing section 103 monitors the idle packet communication state. Alternatively, communication control section 106 may determine whether or not the idle packet communication state has occurred. When communication control section 106 determines that the idle packet communication state has occurred, communication control section 106 may notify data processing section 103 that the idle packet communication state has occurred.

If the amount of packet data to be communicated is 0 packets, data processing section 103 may determine that the idle packet communication state has occurred. Alternatively, data amounts of uplink and downlink channels of the packet communication may be assigned respective thresholds, and if the data amounts of the uplink and downlink channels become lower than their thresholds, data processing section 103 may determine that the idle packet communication state has occurred. It should be appreciated that this exemplary embodiment is not limited to the idle communication state determination methods including the foregoing methods.

Thereafter, if user interface section 101 notifies data processing section 103 of new site information (at step S210), data processing section 103 stops recording the idle communication time (at step S211) and notifies data storage section 104 of the web site information and the idle communication time in each communication state (at step S212).

An event in which data processing section 103 stops recording the idle communication time occurs for example at the time when packet communication data occur, or at the time when packet communication data occur and thereby a communication state transition has occurred. An event in which data processing section 103 starts recording the idle communication time may occur when the radio environment deteriorates and thereby packet communication is disconnected.

Data storage section 104 collates the web site information notified by data processing section 103 with the history information stored therein.

If the mobile phone terminal has stored the same site history as that represented in the web site information (at step S213), data storage section 104 calculates the average idle communication time of the past idle communication and the newly recorded idle communication time (at step S214) and updates the past idle communication time that is stored in the history information into the average idle communication time (at step S215).

If the mobile phone terminal has not stored history information of the same site (at step S213), data storage section 104 stores the newly recorded information as history information (at step S215).

Figure 3:
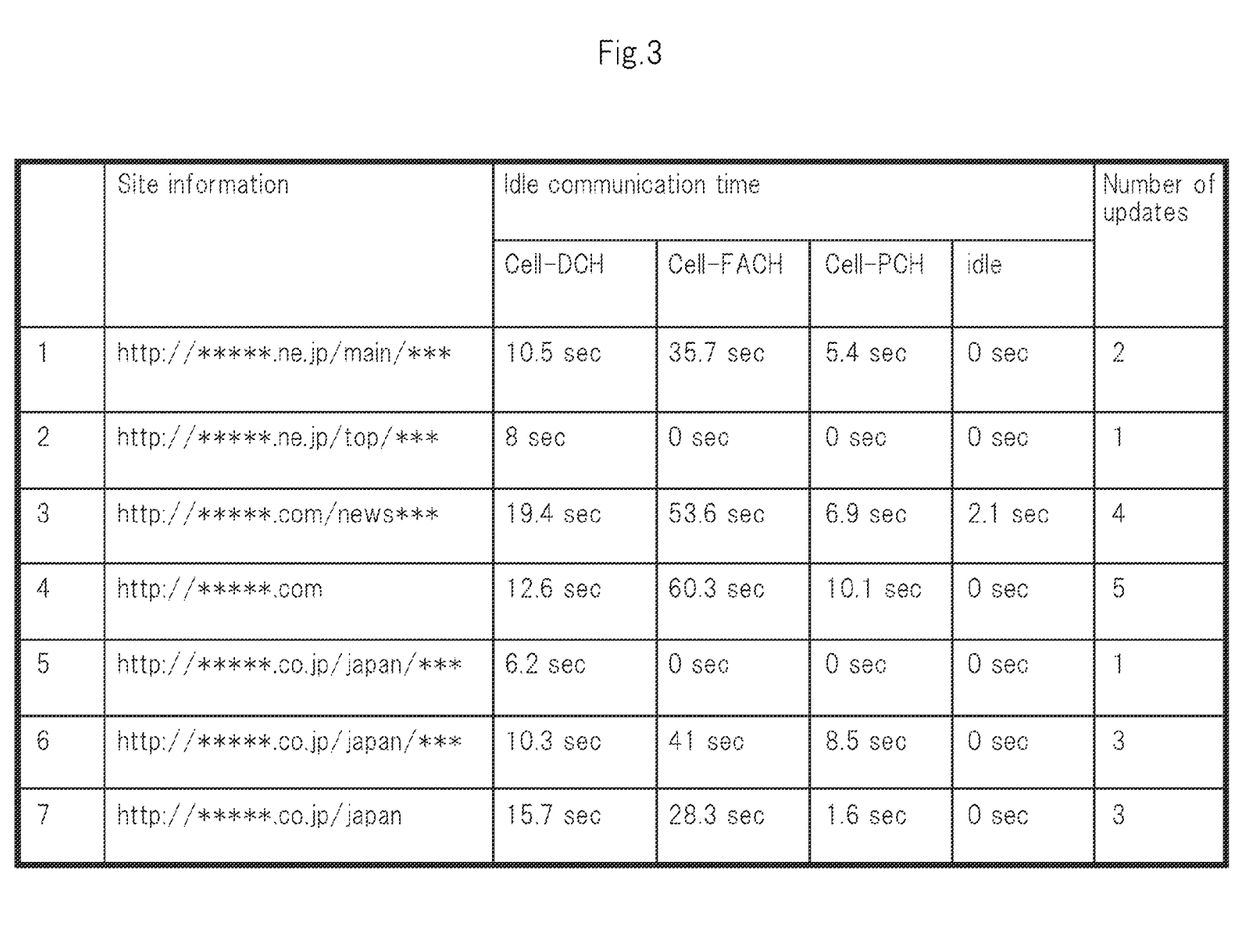
FIG. 3 is a schematic diagram showing an example of history information.

FIG. 3 shows an example of history information stored in data storage section 104.

According to this exemplary embodiment, the stored history information represents site information (for example, URL), average idle communication time in each communication state, and the number of updates.

However, as long as the history information stored in data storage section 104 contains a parameter used to collate site information with past browsing history and a parameter used to calculate the average idle communication time, the format of the history information is not restricted.

If the stored history information contains site information notified by data processing section 103, the average idle communication time Tave is calculated according to the following formula in which the past average idle communication time is denoted by Tave_old, the number of updates is denoted by N, and the current idle communication time is denoted by Tnew.

$$Tave = (Tave\_old \times N + Tnew)/(N+1)$$

(B) Correction Method for Fast Dormancy Function Startup Timer Value

Figure 4:
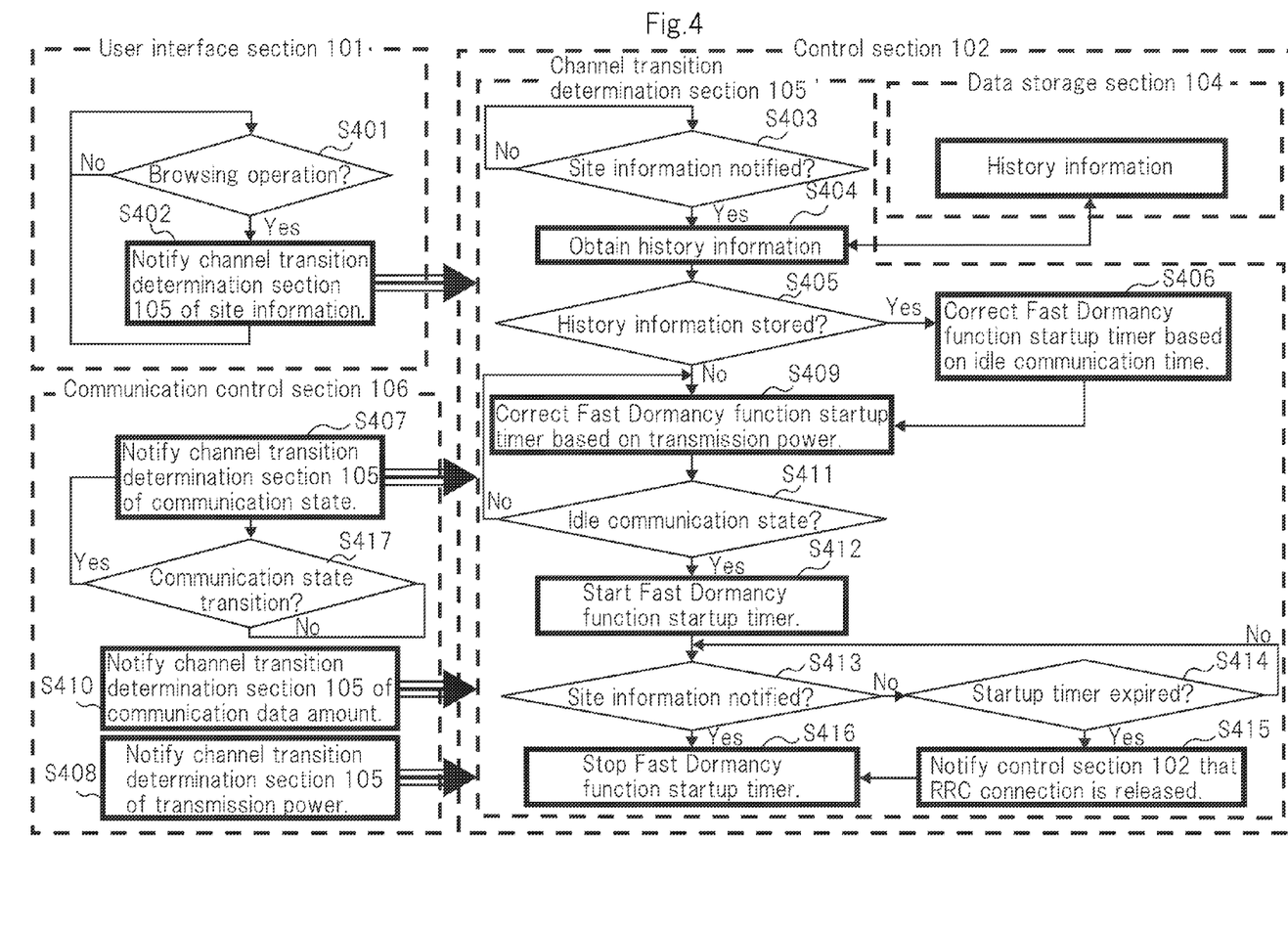
FIG. 4 is a flow chart describing a correction method for a Fast Dormancy function startup timer.

FIG. 4 is a flow chart describing the correction method for Fast Dormancy function startup timer value.

Channel transition determination section 105 inquires about history information of data storage section 104 based on web site information (for example, URL) (at steps S401, S402, and S403) notified by user interface section 101. If data storage section 104 has stored history information about browsing the web site, channel transition determination section 105 obtains the average idle communication time in each communication state (at step S404).

If data storage section 104 has stored history information about browsing the web site (at step S405), channel transition determination section 105 corrects the Fast Dormancy function startup timer value based on information of the average idle communication time in each communication state (at step S406). If data storage section 104 has not stored the history information about browsing the web site (at step S405), channel transition determination section 105 does not correct the Fast Dormancy function startup timer value based on the average idle communication time in each communication state.

The reference idle packet communication time in each communication state has been set for channel transition determination section 105. If the average idle communication time of history information becomes greater than the reference time, channel transition determination section 105 corrects the timer value corresponding to the difference.

It is assumed that pre-corrected timer value is denoted by T.

In addition, it is assumed that the reference idle packet communication time in the Cell-DCH state is denoted by "Db," the reference idle packet communication time in the Cell-FACH state is denoted by "Fb," the reference idle packet communication time in the Cell-PCH state is denoted by "Pb," and the reference idle packet communication time in the packet idle state is denoted by "Ib."

Moreover, it is assumed that the average idle communication time of history information in the Cell-DCH state is denoted by "Da," the average idle communication time of history information in the Cell-FACH state is denoted by "Fa," the average idle communication time of history information in the Cell-PCH state is denoted by "Pa," and the average idle communication time of history information in the packet idle state is denoted by "Ia."

If the average idle communication time of history information in each communication state is greater than the reference time, the difference between the average idle communication time of history information and the reference idle packet communication time is a positive integer in each communication state and can be calculated as follows.

In the Cell-DCH state: Dd=Da−Db where Dd>0
In the Cell-FACH state: Fd=Fa−Fb where Fd>0
In the Cell-PCH state: Pd=Pa−Pb where Pd>0
In the packet idle state: Id=Ia−Ib where Id>0

Next, it is assumed that the weighting coefficient in the Cell-DCH state is denoted by "Dk," the weighting coefficient in the Cell-FACH state is denoted by "Fk," the weighting coefficient in the Cell-PCH state is denoted by "Pk," and the weighting coefficient in the packet idle state is denoted by "Ik," rhrerfore the correction timer value T1 can be calculated as follows.

$$T1 = T \times (1 - Dk \times Dd - Fk \times Fd - Pk \times Pd - Ik \times Id).$$

Each weighting coefficient is stored in channel transition determination section 105.

The weighting coefficients are used in the individual communication states because the amount of current that is consumed varies in the individual communication states. When the weighting coefficients are assigned as Dk>Fk>Pk>Ik, the effects of reducing the amount of current used in the individual communication states can be reflected in the correction values.

In other words, assuming that the amount of current that is consumed is measured in the individual communication states for a predetermined time, the Cell-DCH state uses the greatest among of current compared to the other communication states. The Cell-FACH state and Cell-PCH state next use the largest amount of current. The packet idle state consumes the lowest amount of current. This relationship is reflected in the correction values.

In addition, channel transition determination section 105 monitors the current communication state and transmission power value notified by communication control section 106 (at steps S407 and S408) and calculates the correction value of the timer value based on the transmission power value (at step S409).

The correction value can be calculated in such a manner that channel transition determination section 105 calculates the average transmission power and compares the average transmission power with a plurality of transmission power thresholds that have been set for channel transition determination section 105. The timer value is corrected based on the transmission power value when the communication state is the Cell-DCH state or the Cell-FACH state.

For example, channel transition determination section 105 corrects the timer value such that it is reversely proportional to the average transmission power.

When the communication state is the Cell-DCH state, since the mobile phone terminal always maintains transmission using an uplink communication channel, the correction value is calculated based on the average transmission power value for a predetermined time.

In contrast, when the communication state is the Cell-FACH state, since the mobile phone terminal discretely performs transmission using a common uplink channel (RACH), the correction value is calculated based on the average value in which the initial powers of the RACH transmission are divided by a predetermined number of times.

If the timer value T has been corrected based on the idle communication time at step S406, channel transition determination section 105 actually corrects the timer value T. Alternatively, the timer value may be actually corrected in such a manner that while the timer value is being counted, the timer value is frequently updated.

Thereafter, like the case at step S207 shown in FIG. 2, when channel transition determination section 105 determines that the idle packet communication state has occurred (at step S411) based on information about the amount of packet data to be communicated received from communication control section 106 (at step S410), channel transition determination section 105 starts counting the corrected timer value (at step S412).

If the counted timer value expires (at step S413 and S414), channel transition determination section 105 notifies communication control section 106 that the RRC connection to the NW has been released (at step S415). Thereafter, channel transition determination section 105 resets the timer value to the initial value T (at step S416).

Before the counted timer value expires, if user interface section 101 notifies channel transition determination section 105 of new site information (at step S413), channel transition determination section 105 stops counting the timer value (at step S416) and advances to step S403.

An event in which user interface section 101 stops counting the timer value may occur at the time when packet communication data occur, or at the time when packet communication data occurs and thereby a communication state transition occurs (at steps S417 and S407).

However, in this case, since site information has not changed, the flow advances to step S406.

Next, the effect of this exemplary embodiment will be described.

According to this exemplary embodiment, since the idle communication time of each page that is browsed is recorded, the user's operation style (preference) can be recognized. The Fast Dormancy function startup timer value is corrected based on the history information. Consequently, an energy saving effect and suppression of unnecessary channel transitions corresponding to each user's operation style (preference) can be realized.

For example, it is assumed that there is a web page that the user frequently browses and the browsing time of the web page tends to be long. According to this exemplary embodiment, while this page is being browsed, a timer value that is smaller than normal is set up. As a result, a communication state transition to the packet idle state can be quickly performed and thereby the amount of current that is consumed can be reduced.

In contrast, for a page whose browsing time represented in history information is short, the timer value is not deceased. As a result, since the RRC connection is not released when there is no need to release it and thus the operability for the user can be ensured.

In addition, since the idle communication time in each communication state is recorded and the timer value is corrected with weighted coefficients based on history information and communication state, the result is that an energy saving effect of the mobile phone terminal can be effectively accomplished corresponding to the user's activity area.

For example, the communication state transition time in the NW may differ area by area. In this case, the amount of current that is consumed by the mobile phone terminal may largely differ area by area even in the same idle communication time.

Figure 5:
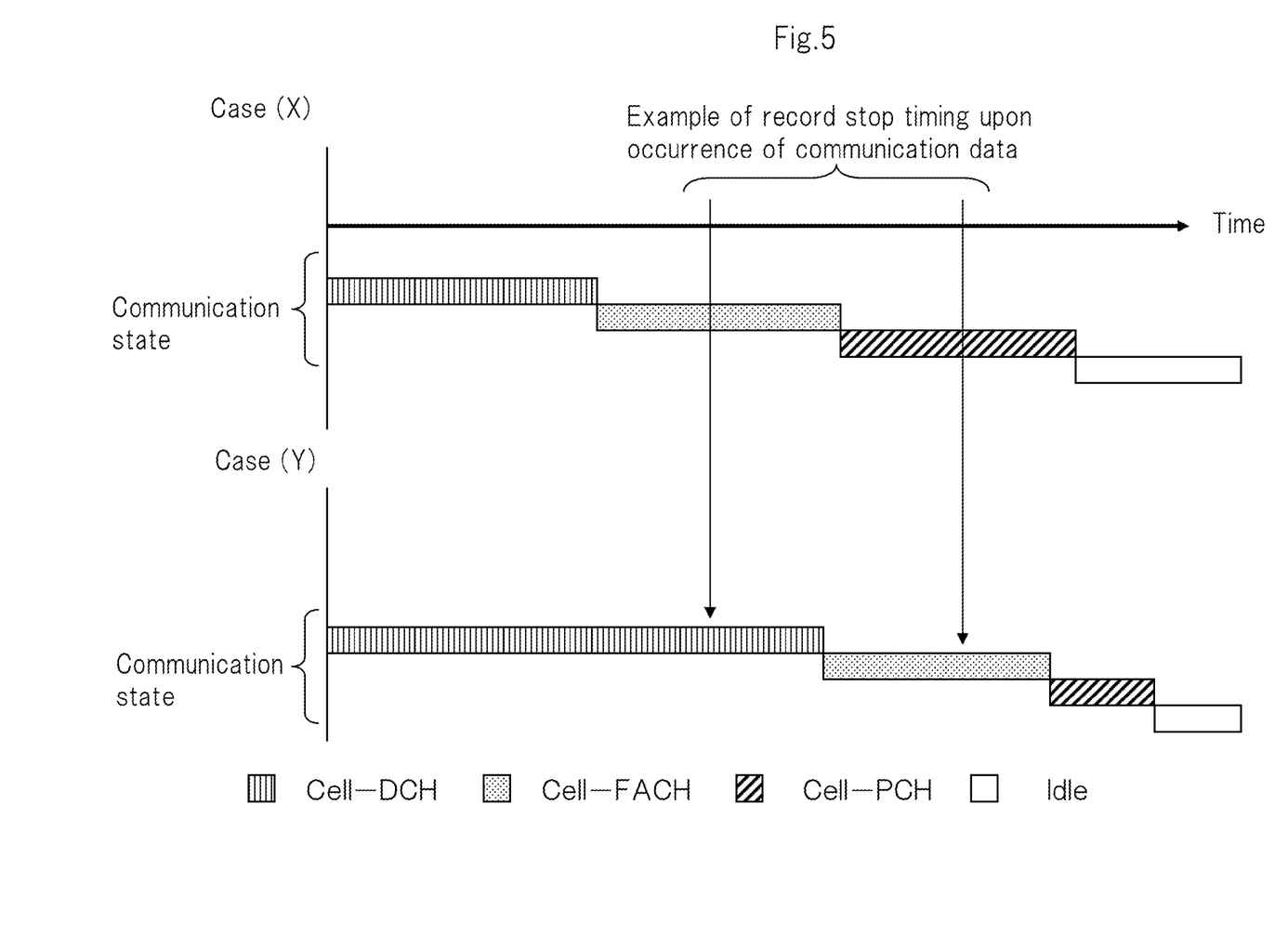
FIG. 5 is a schematic diagram showing an example of NW areas that differ in communication state transitions.

As shown in FIG. 5, if there are an NW area where a communication state transition takes place as in case (X) and an NW area where a communication state transition takes place as in case (Y), the time at which the mobile phone terminal maintains the Cell-DCH state in case (Y) is longer than that in case (X). Thus, even if the packet communication data generation timing and idle communication time in case (Y) are the same as those in case (X), the amount of current that is consumed in case (Y) is greater than that in case (X).

According to this exemplary embodiment, when the Fast Dormancy function startup timer value is corrected, weighting is performed corresponding to each communication state.

Thus, even if the idle communication time in case (Y) is the same as that in case (X), the correction value in case (Y) is greater than that in case (X). As a result, the mobile phone terminal can more quickly perform a communication state transition to the packet idle state in case (Y) than in case (X).

In case (Y), the Cell-DCH state where a large amount of current is used last long. Thus, when a communication state transition to the packet idle state is performed early, a much larger energy saving effect can be expected.

If the timer value is corrected based on the transmission power value, the current consumption can be reduced corresponding to each user's operation environment.

For example, in an operation environment where the reception electric field is weak, since the transmission power value is large, the amount of current that is consumed becomes very large compared to that in an operation environment where the reception electric field is strong. Thus, if the transmission power value is large, the timer value is decreased such that the RRC connection is more quickly released and a communication state transition to the packet idle state is performed. As a result, the current consumption can be effectively reduced.

(Second Exemplary Embodiment)

Next, a mobile phone terminal according to a second exemplary embodiment of the present invention will be described. The structure of the mobile phone terminal according to the second exemplary embodiment is the same as the structure of the mobile phone terminal according to the first exemplary embodiment except for the operation of channel transition determination section 105.

According to the second exemplary embodiment, in (B) correction method for Fast Dormancy function startup timer value described in the first exemplary embodiment, channel transition determination section 105 corrects the timer value based on the reception electric field value of the mobile phone terminal rather than the transmission power value. For example, channel transition determination section 105 corrects the timer value such that it is in proportion to the reception electric field value.

According to the first exemplary embodiment, the timer value is corrected only when the communication state is the Cell-DCH state or the Cell-FACH state. In contrast, according to the second exemplary embodiment, since the Fast Dormancy function startup timer value is corrected based on the reception electric field value, the timer value can be corrected even when the communication state is the Cell-PCH state.

According to the second exemplary embodiment, the same effect as the first exemplary embodiment can be accomplished.

(Third Exemplary Embodiment)

Next, a mobile phone terminal according to a third exemplary embodiment of the present invention will be described. The structure of the mobile phone terminal according to the third exemplary embodiment is the same as the structure of the mobile phone terminal according to the first exemplary embodiment except for the operation of channel transition determination section 105.

According to the third exemplary embodiment, in (B) correction method for the Fast Dormancy function startup timer value described in the first exemplary embodiment, channel transition determination section 105 determines whether or not to execute the Fast Dormancy function based on the transmission power value rather than to correct the timer value based thereon.

For example, channel transition determination section 105 does not perform the Fast Dormancy function itself when the transmission power value is equal to or smaller than the threshold.

As described above, the Fast Dormancy function has the effect of current consumption reduction with a tradeoff of user's operability such as necessity of a packet communication resume time for the RRC reconnection. Thus, if the transmission power value is low and the current consumption level is permissible, there may be a case in which the RRC connection is not released taking into consideration of the operability for the user. In this case, the reception electric field value may be used instead of the transmission power value. In this case, channel transition determination section 105 does not perform the Fast Dormancy function if the reception electric field value is equal to or greater than the threshold.

(Fourth Exemplary Embodiment)

Next, a mobile phone terminal according to a fourth exemplary embodiment of the present invention will be described. The structure of the mobile phone terminal according to the fourth exemplary embodiment is the same as the structure of the mobile phone terminal according to the first exemplary embodiment except for the operations of data storage section 104 and channel transition determination section 105.

According to the fourth exemplary embodiment, data storage section 104 does not record (A) the idle communication time of each web page unlike the first exemplary embodiment. Instead, data storage section 104 stores history information of the idle communication time of each communication state. Channel transition determination section 105 uses history information to correct the timer value. In this case, since the user's unique information is stored, an energy saving effect can be realized corresponding to each user's operation style.

(Fifth Exemplary Embodiment)

Next, a mobile phone terminal according to a fifth exemplary embodiment of the present invention will be described. The structure of the mobile phone terminal according to the fifth exemplary embodiment is the same as the structure of the mobile phone terminal according to the first exemplary embodiment except for the operations of data storage section 104 and channel transition determination section 105.

According to the fifth exemplary embodiment, data storage section 104 does not record (A) idle communication time of each web page unlike the first exemplary embodiment. Instead, data storage section 104 stores history information of the idle communication time of each web page. Channel transition determination section 105 uses the history information to correct the timer value. In this case, since the user's unique information is stored, an energy saving effect can be accomplished corresponding to each user's operation style.

With reference to the exemplary embodiments, the present invention has been described. However, it should be understood by those skilled in the art that the structure and details of the present invention may be changed in various manners without departing from the scope of the present invention.

The present application claims priority based on Japanese Patent Application JP 2010-290591 filed on Dec. 27, 2010, the entire contents of which are incorporated herein by reference in its entirety.

DESCRIPTION OF REFERENCE NUMERALS

101 User interface section
102 Control section
103 Data processing section
104 Data storage section
105 Channel transition determination section
106 Communication control section
107 Radio section
108 Recording section

What is claimed is:

1. A mobile phone terminal that has a transition request function in which said mobile phone terminal transmits to a network a state transition request that the state of communication with the network be set to a packet idle state when a packet communication idle state continues for a predetermined time in a state in which said mobile phone terminal is connected to said network in a Radio Resource Control (RRC) state, said mobile phone terminal comprising:
  a controller configured to control said transition request function based on a communication history of said mobile phone terminal, based on a transmission power value of said mobile phone terminal, or based on a reception electric field value of said mobile phone terminal,
  wherein the communication states in which said mobile phone terminal communicates with said network include a Cell-DCH state, a Cell-FACH state, and a Cell-PCH state besides said packet idle state, and
  wherein the controller includes:
    a storage storing communication history information that indicates an idle packet communication time in each of said communication states, and
    a setting processor weighting the idle packet communication time in each communication state indicated in said communication history information, and when an average of the idle packet communication times that are weighted in each communication state becomes greater than a reference time, adjusting said predetermined time based on a difference between the average and the reference time.

2. A communication state transition method for a mobile phone terminal that has a transition request function in which said mobile phone terminal transmits to a network a state transition request that the state of communication with the network be set to a packet idle state when a packet communication idle state continues for a predetermined time in a state in which said mobile phone terminal is connected to said network in a Radio Resource Control (RRC) state, said communication state transition method comprising:
  controlling said transition request function based on a communication history of said mobile phone terminal, based on a transmission power value of said mobile phone terminal, or based on a reception electric field value of said mobile phone terminal,
  wherein the communication states in which said mobile phone terminal communicates with said network include a Cell-DCH state, a Cell-FACH state, and a Cell-PCH state besides said packet idle state, and
  wherein said controlling includes:
    storing communication history information that indicates an idle packet communication time in each of said communication states, and
    weighting the idle packet communication time in each communication state indicated in said communication history information and when an average of the idle packet communication times that are weighted in each communication state becomes greater than a reference time, and adjusting said predetermined time based on a difference between the average and the reference time.

* * * * *